2,836,172

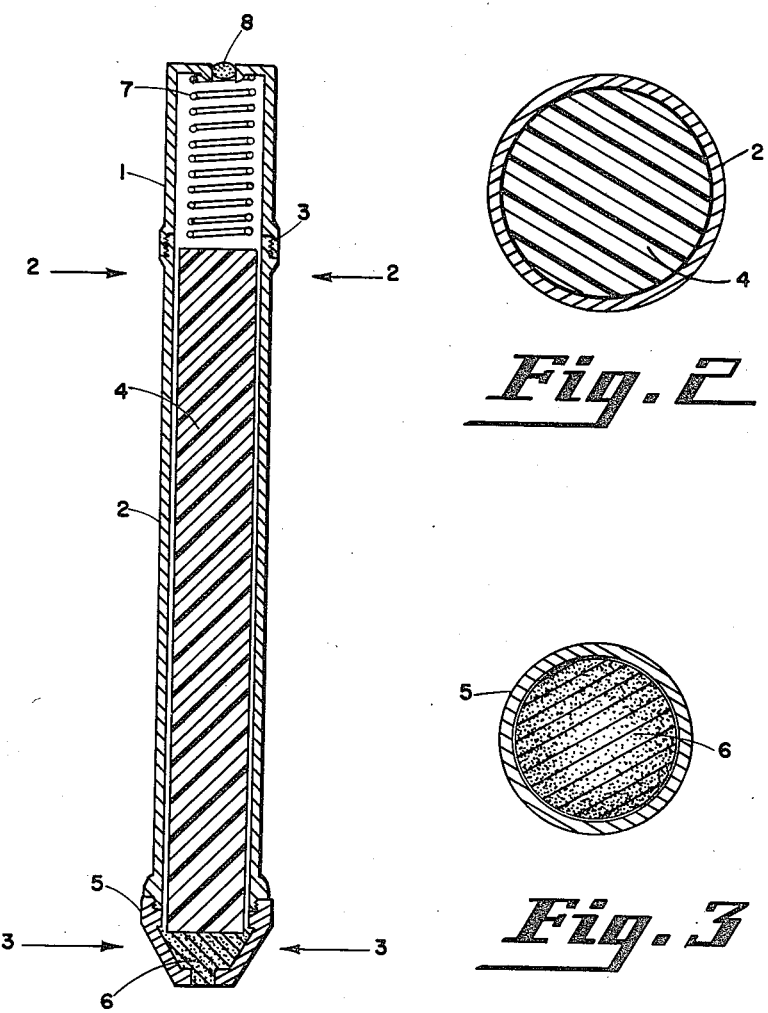

TORCH

Allen S. Ginsburgh, Glendora, and Francis J. Climent, Los Angeles, Calif., assignors to Aerojet-General Corporation, Azusa, Calif., a corporation of Ohio Application May 2, 1955, Serial No. 505,169

3 Claims. (Cl. 126—263)

This invention relates to torches, and more particularly to torches useful for welding, soldering, burning and brazing metals.

An object of this invention is to provide a torch which is inexpensive and simple to operate.

Another object of this invention is to provide a torch which is more convenient to use than torches presently available.

Heretofore, the welding and soldering of metals has usually been accomplished with apparatus burning combustible gases such as acetylene. The complexity, cost and bulk of these devices has prohibited their use in virtually all but commercial applications; moreover, particular skill is required to operate these devices. In addition, the auxiliary apparatus needed, such as gas tanks and supply lines, render them difficult to use in relatively inaccessible places.

In accordance with the present invention, we provide a torch which employs a solid fuel enclosed inside the torch itself. This torch is simple to operate, convenient to use on difficultly accessible parts, and inexpensive to manufacture. Due to the type of fuel employed and the inexpensiveness of the device, this torch can be used in many places where gas burning torches are economically impractical.

According to this invention, a burning stick or cartridge composed of a solid, self-sustaining, combustible material is placed in a holding tube. One end of the holding tube is fitted with a nozzle. When ignited, the burning stick burns at its face in the region of the nozzle and produces a hot flame which extends outward through the nozzle orifice and which can be used for the above mentioned purposes.

The invention will be better understood from the following detailed description and accompanying drawings, of which:

Fig. 1 shows an elevation view in section of a torch incorporating the features of this invention;

Fig. 2 shows a cross sectional view of the torch taken at line 2—2 of Fig. 1; and Fig. 3 shows a cross sectional view of the torch taken at line 3—3 of Fig. 1.

Referring to the drawings, a torch is shown comprised of two parts, namely, the handle 1 and the cylinder 2, which are joined together at 3. The end of the handle 1 is closed and a spring 7 enclosed in the handle is abutted against this closed end. Also located in the handle 1 is a safety plug 8. A nozzle 5 is attached at the opposite end of the cylinder 2. Inside the holding tube is a burning stick 4, one end of which is maintained in contact with the nozzle 5 by the spring 7 pushing against its opposite end. Within the nozzle 5 is a pyrotechnic material 6, which can be in the form of a replaceable cartridge to permit reuse, to permit easy ignition of the burning stick.

The holding tube is usually constructed of metal or high melting plastic, such as a fluorocarbon, fiber-glass or certain aromatic plastics, as for example poly-p-xylene.

The handle 1 and cylinder 2 are joined together at 3 by threads, as shown. This connection can also be made by bayonet, snap-on or twist-on type joints. The safety plug 8 is preferably comprised of a waxy or resinous material. This plug blows out if high gas pressure develops in the tube due to irregular burning of the burning stick.

The nozzle 5 is ordinarily constructed of steel or some other high melting alloy or metal.

The burning stick 4 is composed of a self-sustaining combustible material such as an intimate mixture of a finely divided oxidizer uniformly distributed in a resinous organic binder such as asphalt, polyester resins, etc. Suitable oxidizers are inorganic oxidizing salts such as lithium, sodium, potassium, rubidium, caesium, as well as ammonium and hydrazine salts of chromates, dichromates, permanganates, nitrates, chlorates and perchlorates, customarily incorporated in the burning stick in amounts of from about 40% to about 90% by weight of the total composition.

The burning stick composition is usually compounded by uniformly stirring the oxidizer into softened resin until all of the oxidizer has been added and the mixture has a uniform consistency. The mixture is then allowed to harden into a suitable mold.

The burning stick composition can also be compounded by uniformly stirring the oxidizer into a mixture of polymerizable esters such as a mixture of polymethyl methacrylate, methyl methacrylate monomer, ethyl acrylate monomer and diallyl phthalate, adding a suitable polymerization catalyst such as methyl amyl ketone peroxide and curing the mixture in a suitable mold, or by extrusion of mixtures of oxidizer with rubber like fuels such as the polyurethanes through suitable nozzles.

Other suitable fuel components are thermosetting resins such as phenol-aldehyde resins, alkyd resins and polyalkylene resins. Illustrative of the compositions useful for this invention are the propellant compositions disclosed in United States Patents Nos. 2,434,872 and 2,479,829, and British Patent No. 579,057.

Referring to Fig. 2, a cross sectional view of Fig. 1 taken at line 2—2, there is shown the cylinder 2 and the enclosed burning stick 4.

Referring to Fig. 3, a cross sectional view of Fig. 1 taken at line 3—3, there is shown the nozzle 5 and the pyrotechnic material 6 contained therein.

To load the torch, the handle 1 is separated from the cylinder 2. The burning stick 4 is then inserted into the holding tube and the two sections reassembled. The spring 7 forces the end of the burning stick 4 against the nozzle 5.

In use, the pyrotechnic material 6 is ignited with a match or the like. An example of a suitable pyrotechnic material is a stoichiometric mixture of finely divided magnesium and a finely divided oxidizing material such as potassium perchlorate. The heat from the combustion of pyrotechnic material ignites the burning stick, which in turn burns within the nozzle producing a hot flame which extends through the orifice of the nozzle. As the burning stick 4 is consumed, the spring 7 forces the remaining length of the burning stick into the nozzle so that burning occurs at all times in the region of the nozzle.

It is evident that torches incorporating the features of this invention can have a wide variety of dimensions, as for example, from only a few inches to several feet in length. The diameter can also be varied as desired. The appropriate size of the torch will be determined by the particular application for which it is to be used. It will also be appreciated that the composition of the burning stick can be altered to comply with particular requirements, such as flame temperature and oxidizing or reducing properties.

The torch is particularly adapted for use by persons who need a torch only occasionally and therefore require an inexpensive tool. In addition, the torch can be used by individuals who have not had special training in the use of conventional torches.

We claim:

1. A torch, producing a high temperature flame, usable in welding, brazing and like operations, adapted to be hand held, which comprises, in combination, a solid self-sustaining combustible grain comprising an intimate mixture of a solid oxidizing salt dispersed in a solid combustible fuel enclosed in a casing; a convergent nozzle attached at one end of said casing; pyrotechnic material enclosed within said nozzle; and a hollow handle attached at the opposite end of said casing enclosing means abutting against the end of said grain adapted to maintain the opposite end of said grain in contact with said nozzle as the length of said grain is shortened during operation of the torch.

2. A torch, according to claim 1, wherein said means adapted to maintain the opposite end of said grain in substantial contact with said nozzle is a spring enclosed within said handle, one end of which abuts against the said handle and the other end of which abuts against the end of said grain.

3. A torch, according to claim 2, wherein pressure relieving means comprising a soft pliable plug is provided within the said handle for relieving unusually high pressures within said handle.

References Cited in the file of this patent

UNITED STATES PATENTS

| | | |
|---|---|---|
| 1,452,450 | Tommasi | Apr. 17, 1923 |
| 2,444,957 | Skinner | July 13, 1948 |
| 2,617,251 | Hutcheson | Nov. 11, 1952 |

FOREIGN PATENTS

| | | |
|---|---|---|
| 579,057 | Great Britain | July 22, 1946 |